C. R. UNDERHILL.
METHOD AND MEANS OF SELECTION.
APPLICATION FILED NOV. 19, 1915.

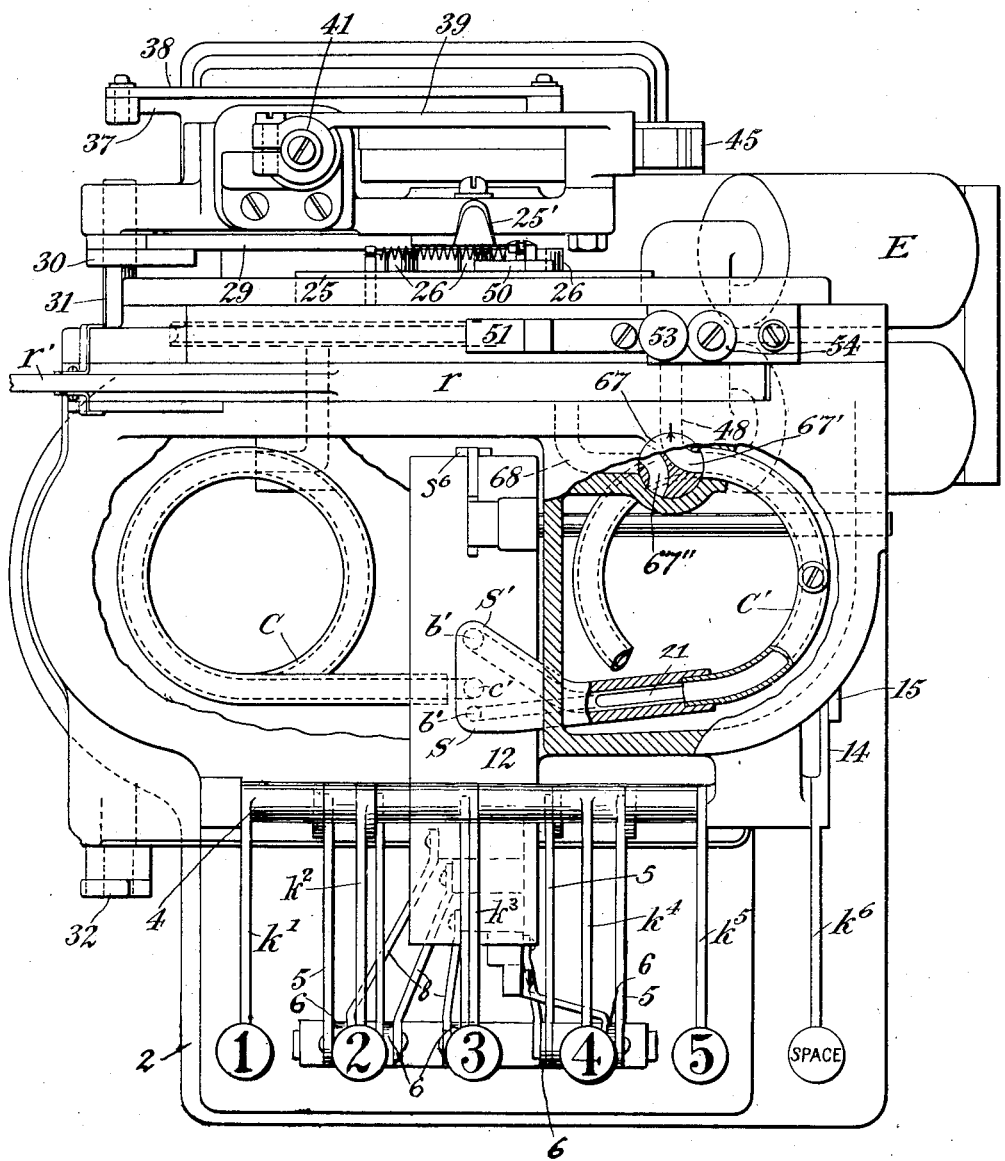

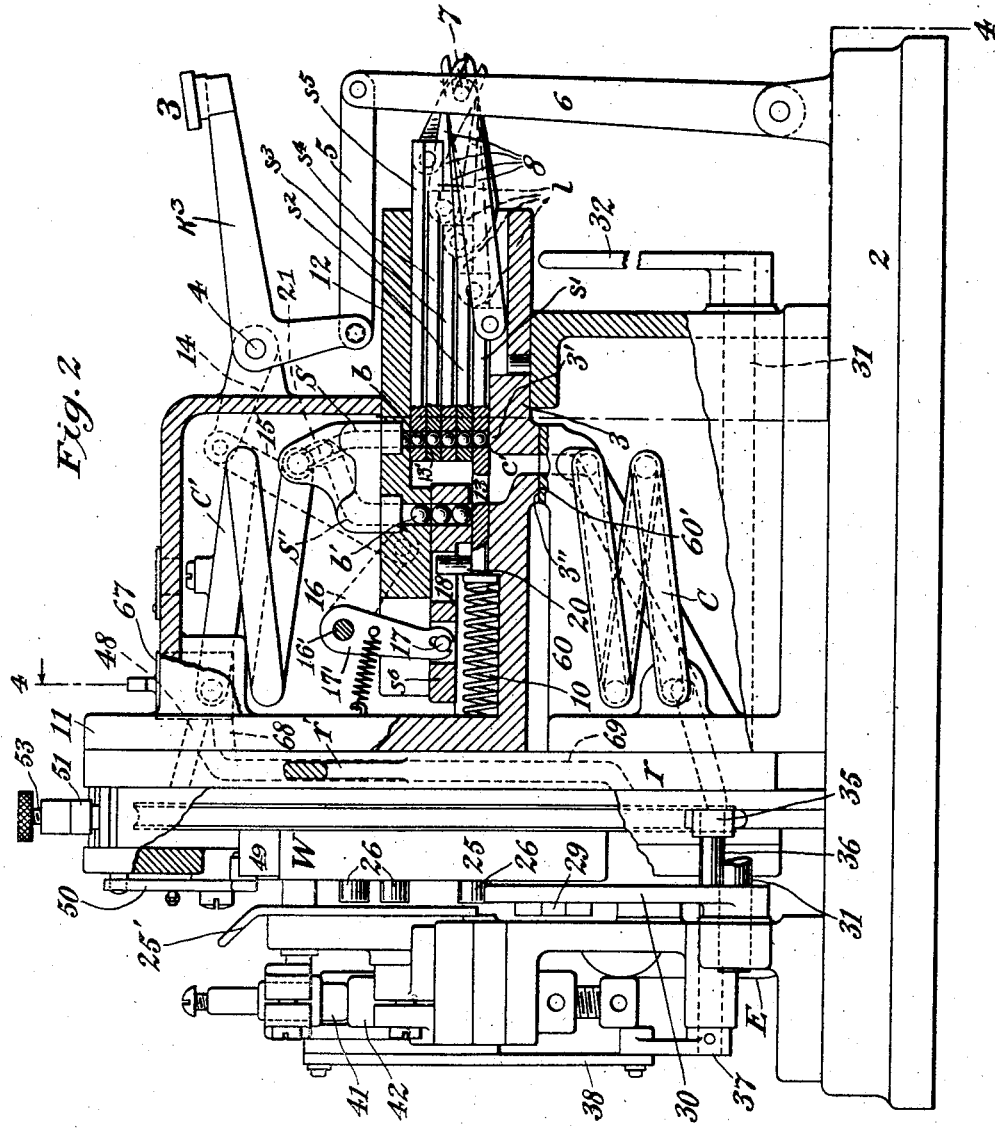

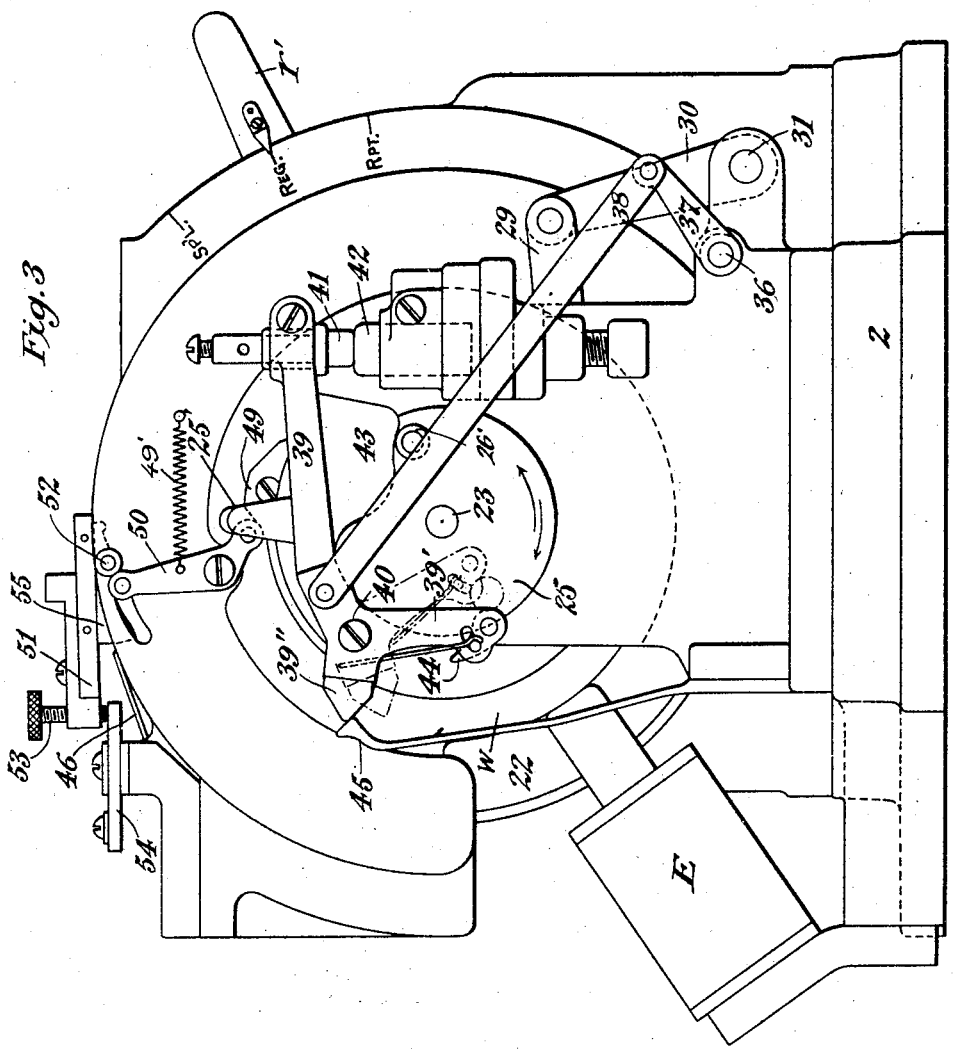

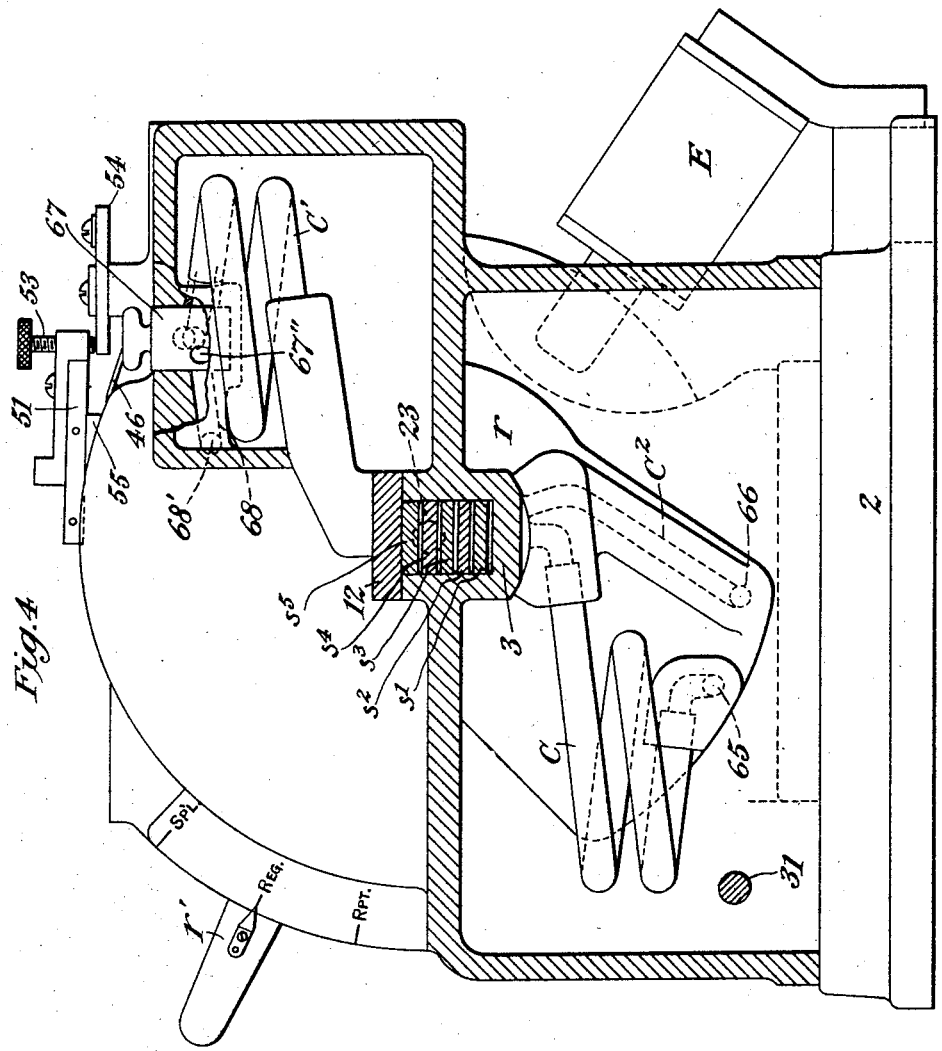

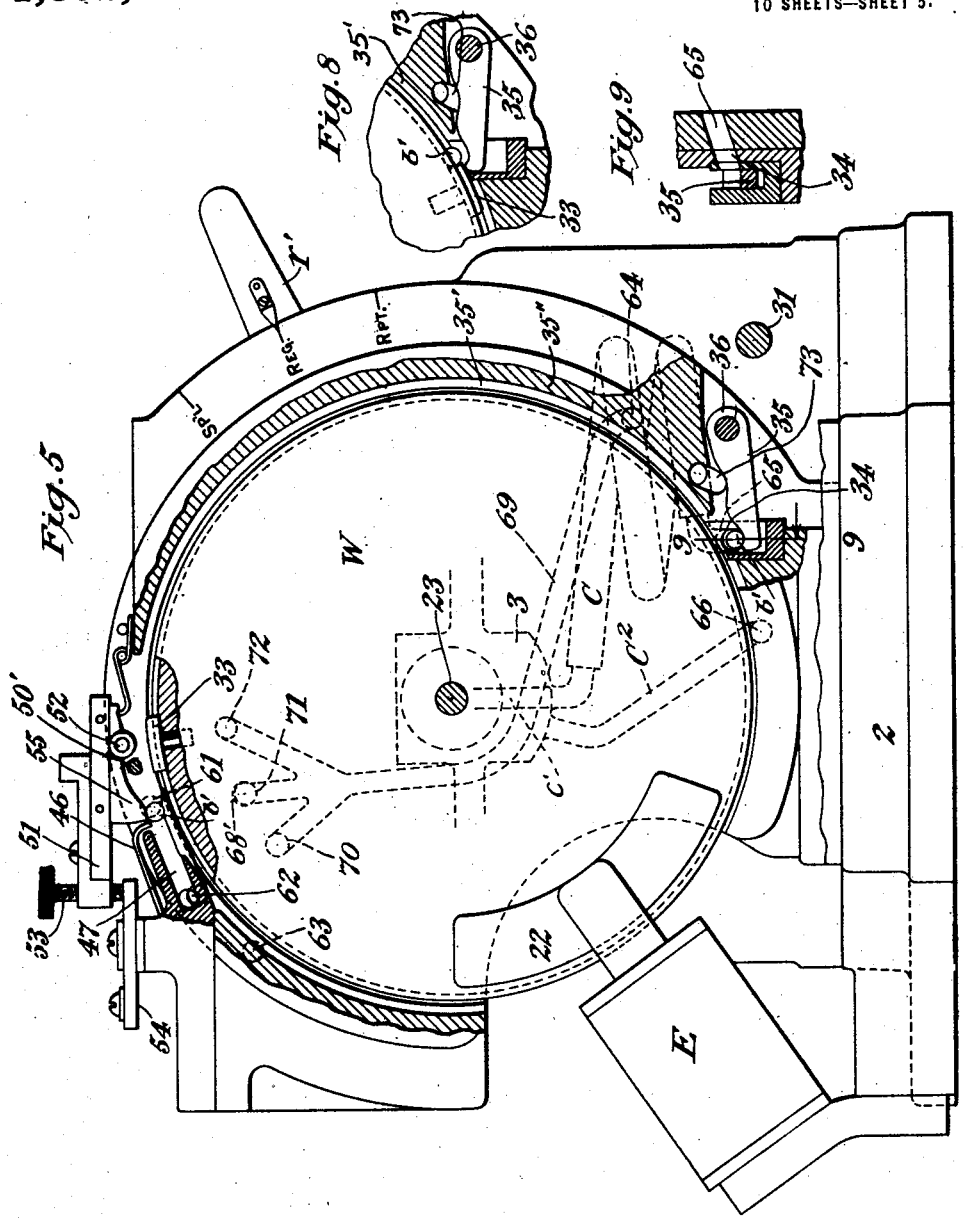

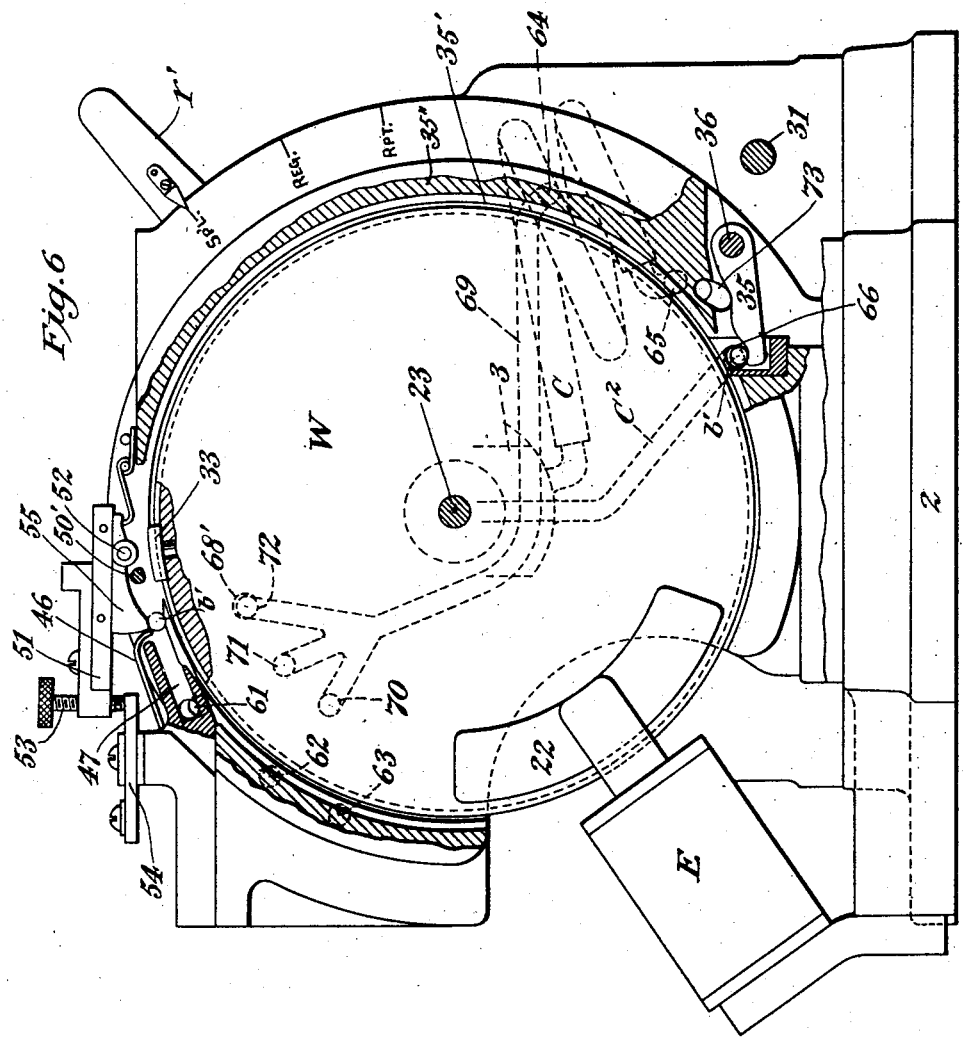

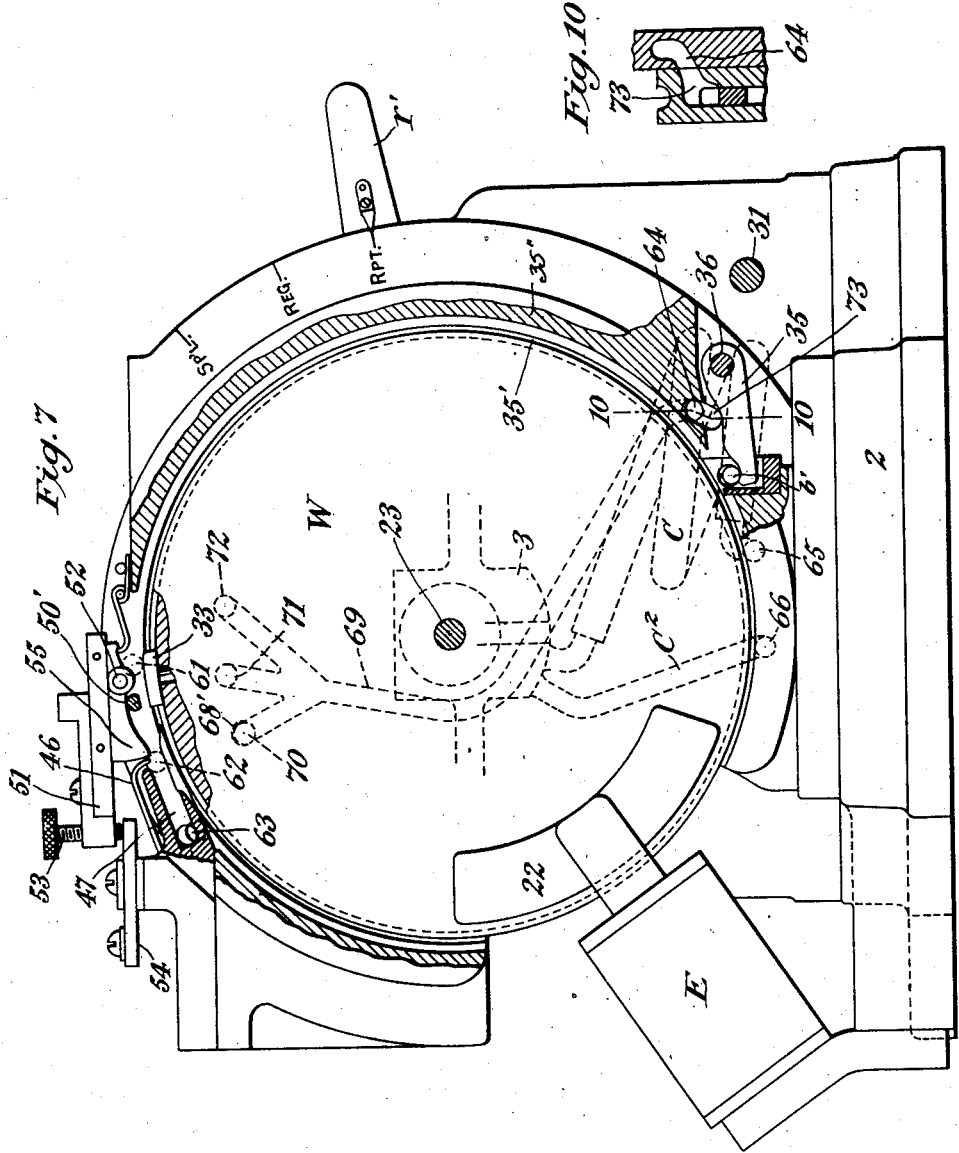

1,392,609.

Patented Oct. 4, 1921.
10 SHEETS—SHEET 8.

Inventor
Charles R. Underhill,
By his Attorney

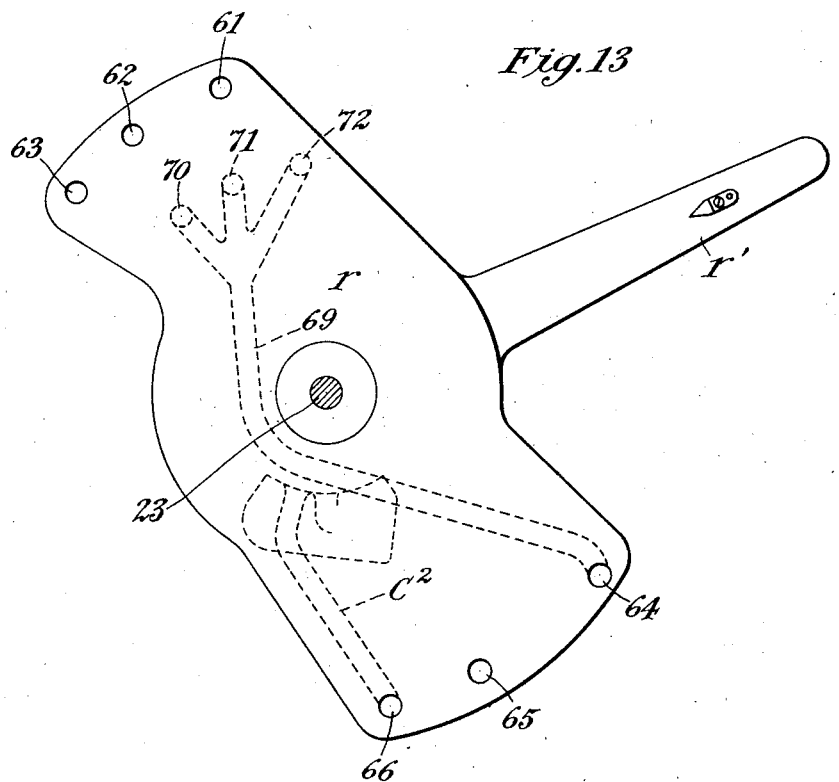
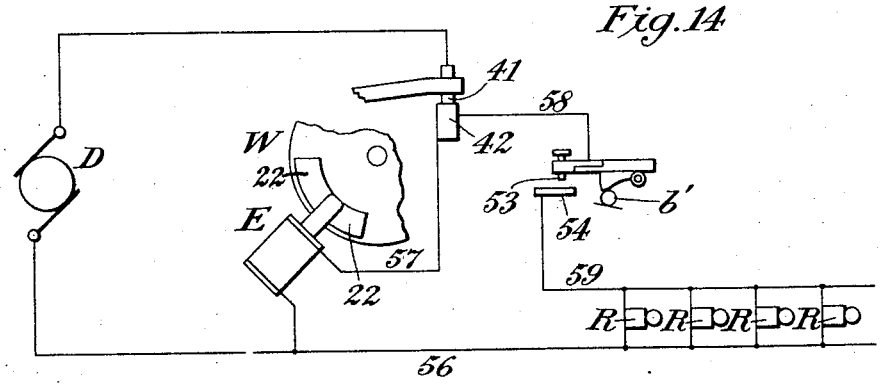

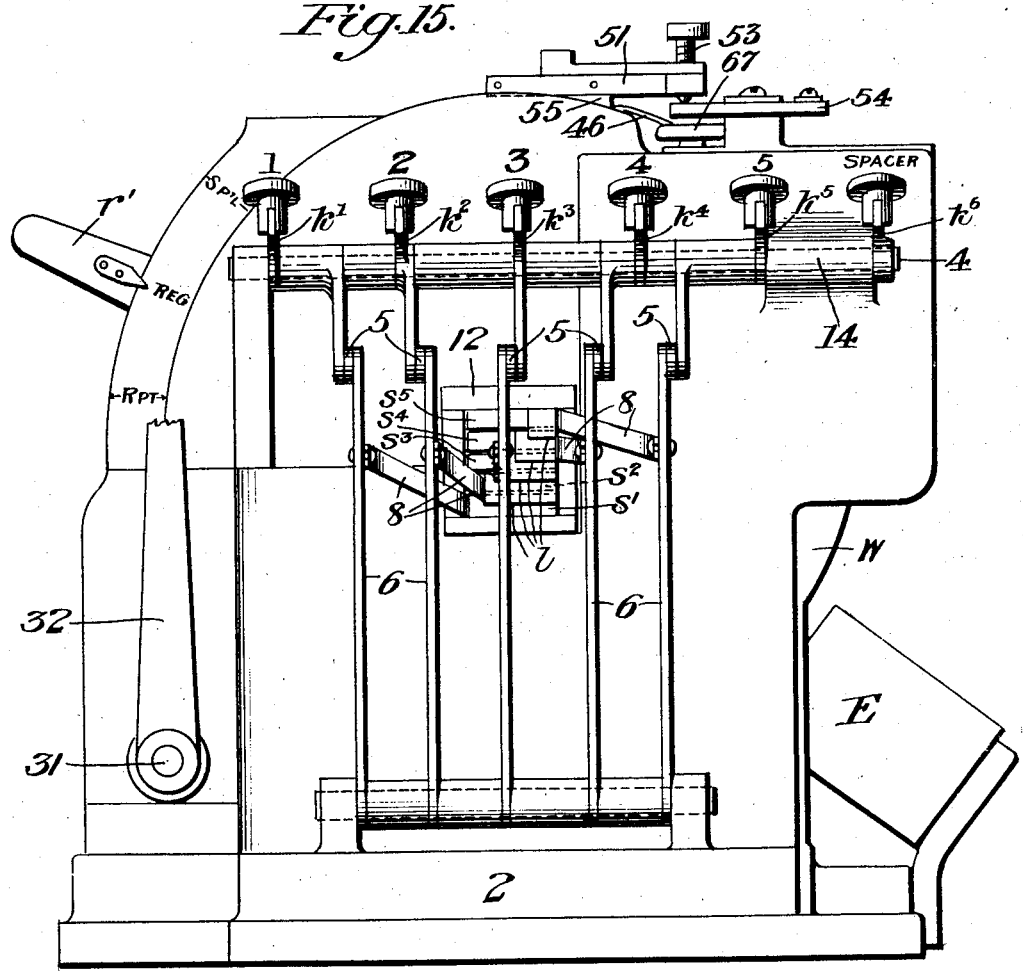

UNITED STATES PATENT OFFICE.

CHARLES R. UNDERHILL, OF NEW HAVEN, CONNECTICUT.

METHOD AND MEANS OF SELECTION.

1,392,609.    Specification of Letters Patent.    Patented Oct. 4, 1921.

Application filed November 19, 1915. Serial No. 62,270.

*To all whom it may concern:*

Be it known that I, CHARLES R. UNDERHILL, a citizen of the United States, and a resident of New Haven, in the county of New Haven and State of Connecticut, have invented certain new and useful Improvement in Methods and Means of Selection, of which the following is a specification.

The principal object of this invention is to provide an improved method and means for selecting from a stock of suitable movable elements a series or combination of elements characteristic of an operation to be performed and then utilizing that series or combination in the performance of that operation, whether said combination be employed as a means for controlling the operation of some other element, or as a means upon which some other element acts, or otherwise. The principal sphere of usefulness of the invention is the selection of differentiated combinations of elements, each of which combinations has a characteristic function different from that of every other combination selected, and the utilization of these combinations for the production and transmission of signals correspondingly differentiated from one another. It is also specially adapted for use in various types of key-controlled mechanisms, not only for the production and transmission of signals of various kinds but also for other purposes.

Considered in its primary aspect, that is solely as a method and means of selection, the invention is distinguished in various ways from all previous methods and means of selection known to me. In the first place it substitutes for intangible things, such as the punched openings of cards or strips employed as selecting agencies in many types of mechanism, tangible mechanical elements. This alone, of course, is not enough, as various mechanisms, such as linotype and analogous machines, make use of tangible selecting elements; but so far as I am aware all of these employ a large number of different kinds of selecting elements, or else only a single kind, and in each type the freedom of movement of the elements is limited and their use is necessarily restricted to certain specific fields, whereas I employ but a few kinds of selecting elements, preferably two kinds, and these elements are of such a nature and are so freely movable as to be applicable to every type of selecting mechanism within my knowledge. In the second place it substitutes for permanent combinations temporary combinations of elements. This also is not new in such mechanisms, for example, as linotype and type-setting machines; but the elements of the temporary combinations set up in such mechanisms are incapable of use except in such specific machines, whereas, because of their nature and mobility, the movable elements employed by me are adapted for a great variety of uses, especially where it may be required to set up or select any one of a large number of signal-combinations, as in fire-alarm and messenger-call telegraph systems, factory calling systems for telephones, etc. In such signaling systems as these the substitution for the permanent - combination, fixed - contact type of selecting instrument of an instrument in which a relatively large number of signal-combinations may be set up one after another by selection from a comparatively small stock of elements, and the combinations so selected broken up and their elements restored to stock after being used, results in a great saving in space and in the number of parts required and also permits the setting up or selection in an instrument of moderate size of a very much greater number of signal-combinations than is possible with any fixed-contact type of instrument of corresponding size heretofore constructed. In the third place it permits the use of tangible unit elements to represent in various combinations the corresponding multiples of a unit number, and any number within the capacity of the selecting instrument may be brought into action by assembling or integrating from such stock of unit elements successive like elements or groups of like elements corresponding in number to the successive figures of the number and separating or spacing such elements or groups of elements by elements of a different kind. In the fourth place it permits movable elements or unit elements of one kind or of different kinds to be separated from a stock or stocks of such elements, assembled or integrated to form desired combinations and these combinations marshaled in single file for the continuous and rapid utilization of the elements of said file. And in addition, gravity feed of the elements to be assembled, the control of the release of said elements by keys and the employment of small and polished balls of high specific gravity as such elements are preferably combined with the other features enumerated to increase to the maximum the speed with which the selection of successive combinations can be effected.

Considered in its next aspect, that is, with respect to the uses to which the assembled series or integrated combinations of movable or unit elements may be put, my present invention is still more clearly distinguished from the art as I understand it. So far as I am aware it is the first selecting device, in any type of mechanism, for separating a series or combination of tangible elements from a stock of such elements and then using such series to influence the action of an operated member. The various types of apparatus to which such a selecting device is applicable cover a wide field. Some of these types have been hereinbefore mentioned. Those which relate to the art of signaling I consider of most importance— and my present invention is applicable to a great variety of signal systems. The operated element which my selecting device is intended to control is preferably some suitable electrical means; and in a signaling system this selecting device will exercise its influence for the purpose of controlling the character, or production, and preferably also the transmission, of an electrical signal. Whatever the nature of the signal to be transmitted may be my selecting device is intended to control it, this control, where the signal is an electrical impulse transmitted over a wire, ordinarily being exercised by the selecting device acting upon a circuit-controller to make and break an electric circuit or operating to influence in any other suitable manner the current from a source of energy. As will be obvious from what has been said, my present invention extends beyond the mere control and transmission of simple signals, the nature of the selecting instrument being such that it is adapted for the control and transmission of differentiated signals of many different kinds each corresponding to a particular combination in the instrument, and each of these signals transmitted may have a number of makes and breaks representing the correspondingly spaced numerals of a signal number, or the signal may be otherwise modified in any one of many well known ways to correspond to such a number.

Considered in still another aspect, that is with respect to its control of devices located at a considerable or great distance from the selecting instrument, my invention comprehends also the employment of a selecting device or devices in which different combinations of tangible elements separated from stock are first utilized to produce and send from a transmitting point or points differentiated signals, and these differentiated transmitted signals are then employed to automatically bring about the production at a distant receiving point or points of received signals correspondingly differentiated but in other respects of any desired kind. The invention therefore extends to the transmission of information from one or more transmitting points to any one of, or to a large number of, different receiving points distant from the point or points of transmission; and such information may be transmitted in many ways, and its transmission may be substantially simultaneous with the selection of the signal-controlling combinations of elements or deferred relatively thereto for a considerable period of time.

In any mechanism embodying the present invention, whatever the aspect in which the invention may be considered, I may employ as a part of such mechanism suitable means for utilizing the combinations selected in a different order from that of their selection; and after a combination has been once utilized it may be used again, if suitable repeating means be embodied for this purpose. Moreover, in all of the various forms which it may take, the construction may be such that the movable elements or balls used to form the various series or combinations will travel in a circuit from one or more individual stocks or storage devices to an assembling point, where they may be stored in a common storage device ready for use when wanted, after which they may be returned to stock.

An important subordinate feature of the invention is that while the selected combinations are preferably set up by a manual action, which is more or less irregular, these assembled combinations will preferably be utilized by power-operated mechanism which will transfer such combinations, or their elements, in regular timing each to the point of use. The combination of this feature with the storage feature makes it practicable for an operator to set up any desired number of combinations (within limits) one after another, as desired or as may be necessary, and the power mechanism will put them through their cycles of action without any further attention being necessary on the part of the operator.

It will be evident from the foregoing that the invention might be illustrated in the drawings of the present application as embodied in any one of many different kinds of mechanism. That which has been selected for use as illustrative of the invention has been chosen not because it represents the most advanced embodiment of the invention, nor because it exhausts the scope of the invention in its application to the various uses which I now have in mind and which have been indicated; but it has been selected because it shows the first specific embodiment of the main features of the invention that I have fully worked out up to the present time. It represents one specific form of an operative calling system for use in factories, etc., in connection with any usual commercial telephone system; but it is merely illustrative of such a calling system and is not even intended to show the final commercial form that such a calling system may take.

In the specific calling system illustrated,

Figure 1 is a plan with parts broken away of a calling instrument adapted to set up various combinations and transmit corresponding signals to suitable distant calling devices.

Fig. 2 is a side elevation of said instrument, parts thereof being shown in section, the section being taken approximately through the longitudinal center of the intermediate slide.

Fig. 3 is a rear elevation of the same with the parts in the positions they will occupy before the circuit is broken.

Fig. 4 is a sectional elevation of the same, the section taken in line 4—4 of Fig. 2.

Fig. 5 is a rear elevation of the same partly in section, the section being taken substantially in the central vertical plane of the balance-wheel and the positions of the parts being such as control the normal or regular setting up of combinations by the machine.

Fig. 6 is a similar view, showing the parts in positions for setting up one or more special combinations in a special storage device.

Fig. 7 is a similar view, showing a third position of the parts for repeating the action of either a regular or a special combination or combinations.

Fig. 8 is a detail sectional view similar to a part of Fig. 5, but with the parts in a slightly different position, showing the positions of certain transfer devices for starting the operation of transferring a unit element or ball from a common storage device for assembled elements to a point at which the combination is utilized.

Fig. 9 is a sectional detail, the section being taken in line 9—9 of Fig. 5.

Fig. 10 is a sectional detail, the section being taken in line 10—10 of Fig. 7.

Fig. 13 is a detail of the main element of the means for controlling the setting of the parts in the different positions corresponding to the normal, the special and the repeat operations illustrated in Figs. 5-7 inclusive.

Fig. 14 is a diagram showing the complete circuit of the specific calling system in which said calling or transmitting instrument is connected, and also illustrates a group of receivers under the influence of signals transmitted from such instrument.

Fig. 15 is a front elevation of the instrument, illustrating particularly the keyboard mechanism and the means of connecting the various slides thereto.

Similar characters designate like parts in all the figures of the drawings.

Figure 11:
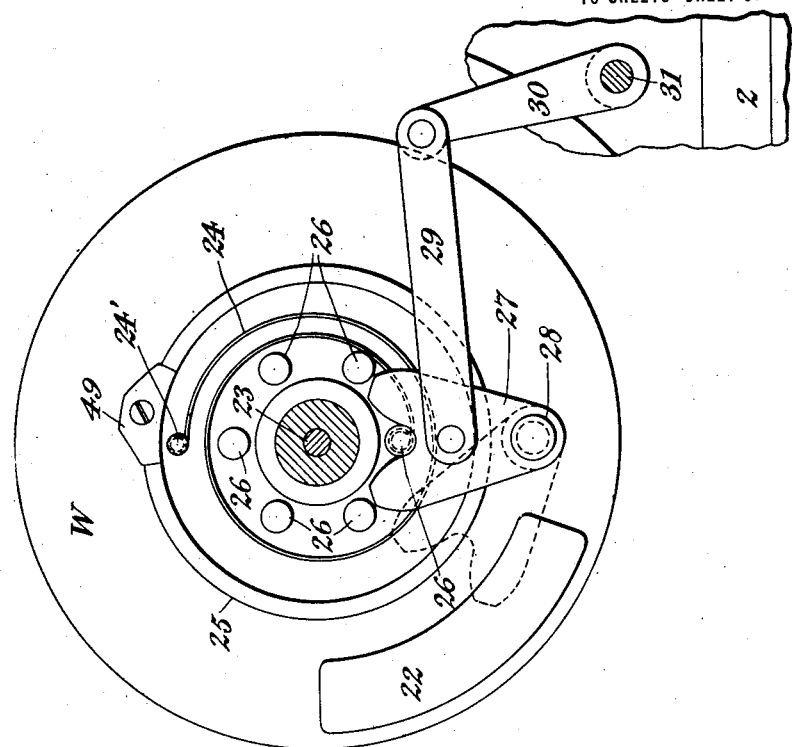
Fig. 11 is a detail illustrating in sectional elevation the balance-wheel and its starting means and also a spring for operating it in one direction and an element of another power device for turning it in the opposite direction.

The machine shown in the drawings as illustrative of one application of my present invention, to wit, its use in a calling system, is a selecting mechanism having a stock of movable elements, preferably unit elements of different kinds, from which stock one or more series or combinations of elements are intended to be separated as desired and utilized, preferably by causing each series or combination to influence a suitable operated element intended to be governed thereby. In the specific type of apparatus illustrated, viz., a calling system, this operated device will usually be an element, such as a circuit-controller, for governing the transmission of an electrical signal, corresponding to such series or combination, to a distant point to attract the attention of a person to be called.

In such a machine it is customary to provide means for sending a considerable number of different signals, each corresponding to a different individual or station in the factory or other building in which the calling system is installed. In calling systems as heretofore constructed different individuals or stations have been represented usually by different sets of fixed contacts at the point from which the signals or calls are to be sent. In the type of instrument illustrated as the first embodiment of a calling system illustrative of my present invention there is no fixed element or combination of elements representative of any particular person or station to be called; but instead there is a stock of movable elements from which different combinations representing such individuals or stations may be separated and assembled, and each such combination representing a particular individual or station to be called is differentiated from every other combination representing a different individual or station. The preferred means which I at present employ for obtaining this differentiation is a stock of unit elements of different kinds, usually two kinds, the means here illustrated being unit balls of two different sizes drawn from a stock contained in a suitable storage device or devices and adapted to be assembled or integrated to form different combinations, representative of different whole numbers, by suitable means which will be more fully described later.

In a calling system as ordinarily employed each person or station to be called is usually represented by a number, these numbers being differentiated in accordance with the differences in individuals or stations. I have found that all the numbers needed for a calling system, and indeed a very much larger number of them than such a system requires, may be represented and controlled by a comparatively small stock of unit elements or balls of two kinds adapted to be used over and over again and assembled as desired in different combinations. Unit elements or balls of one kind may represent whole numbers, such for example as 1, 2, 3, 4 and 5, and will so represent them in the particular embodiment of the invention shown according as one, two, three, four or five unit elements of one kind, such as the small balls shown, are separated from stock without being separated from one another by a unit element or elements of the other kind. I prefer to employ the unit elements of the other kind, which as shown here are larger balls, as means for spacing the first elements or small balls from one another. For example, a combination of unit elements made up of only two different kinds of units, representing say the number 123, may be integrated by separating from stock first one small ball, then one large ball, then two small balls, then one large, then three small balls— and preferably one or more large balls thereafter to separate the combination so integrated from the next combination to be integrated or set up.

The separation of such different unit elements or balls from a suitable stock of the same carried by and forming part of the calling instrument is preferably controlled by suitable keys the principal ones of which are here shown as corresponding to the number of unit elements of one kind, such as the small balls, which it is desired to release or bring into action for a given number. In order to accomplish the desired result the calling instrument shown, which is illustrated as having a main base, 2, on which all of the other parts are mounted, embodies five key levers, designated respectively by $k^1$, $k^2$, $k^3$, $k^4$ and $k^5$, and each of these is intended in this instrument to bring into action when operated a number of small balls corresponding to the number shown on each key, that is to say one of these key-levers is intended to bring about the separation from said stock of unit elements or balls of one such element, while the other keys are adapted respectively to separate from stock two, three, four or five such elements each time the corresponding key is operated.

Any suitable means may be employed between these key-operated devices and the stock of movable elements to bring about these results. One specific means suitable for the purpose is illustrated and though various other specific types of means for accomplishing said result may be employed it will be clear from said drawings that this is one simple way of obtaining said result. In said mechanism the principal element for effecting the separation of one or more balls as desired from stock is a plurality of slides, here shown as superimposed vertically one upon another so as to move back and forth in horizontal planes as they are brought into action by the keys and then restored to their normal positions. Five slides are shown and these are adapted to bring about the separation from stock at one time of one, two, three, four or five unit elements of one kind, such as small balls, according as one or another of said key-levers $k^1$—$k^5$ is depressed. These slides are designated respectively by $s^1$, $s^2$, $s^3$, $s^4$, and $s^5$. They are mounted in this case in a suitable opening in the central support 3 of the machine and each has a vertical aperture extending therethrough and normally in alinement with an aperture 13' of like size in each of the other slides, so that all of these apertures registering with one another form a normally continuous passage into which the aforesaid units of one kind, that is, the small balls, are intended to pass from a suitable storage device for said units or balls. Normally, in the specific construction illustrated, there will be five of these balls in vertical alinement with one another in the passage formed by the registering apertures in the slides $s^1$—$s^5$. Normally also the release of these balls from said apertures in the slides and from the stock of small balls will be prevented, as by the stop face 3' of the support 3, which stop face normally closes the aperture in the lowermost slide and therefore prevents the discharge of any of said balls. It should be noted that each slide at said aperture is substantially of the same thickness as the diameter of a small ball and that the length of the opening formed by the five registering apertures in the five slides is just sufficient to receive five of said small balls.

Any one, or two, or more of the five balls contained in the passage formed by the registering apertures in the five slides may be separated from stock and released from the slides by moving the corresponding slide or slides toward the rear of the machine into alinement with a suitable discharge opening, which in this case leads to a common storage device for unit elements of different kinds, that is to say to a common storage device adapted to receive assembled or integrated combinations of large and small unit elements or balls. Such a discharge opening is illustrated for example at $c'$. In this case it is a short vertical passage leading to and in fact forming part of a common storage device into which the integrated combinations of unit balls are intended to be delivered in the normal, that is, in the regular, operation of the calling instrument. The means by which these slides are shifted toward the rear of the instrument to bring them into alinement with the discharge opening $c'$, to permit the discharge thereinto of a corresponding number of small balls, may be any suitable for the purpose. Here all of the key-levers $k^1$—$k^5$ are shown as mounted for movement about a common axis in a rod, 4, suitably supported at the top of the front of the instrument, said key-levers being suitably spaced on said rod. Each key-lever is formed as an angle-lever the short arm of which depends and is connected at its lower end by means of a link, such as 5, to a vertical lever, 6, having a pin, such as 7, straddled by the forward split end of a link, such as 8, connected to the forward end of the corresponding slide $s^1$—$s^5$. By means of these connections the downward movement of each key is transmitted, as will be obvious, to the slide or slides controlled thereby and said slide or slides moved to the rear. The first lever 6 is connected to the slide $s^1$, the second lever 6 to the slide $s^2$, the third lever 6 to the slide $s^3$, and so on, and each slide is provided with a depending shoulder or stop 1. Said depending shoulder of each slide, with the exception of slide $s^1$, engages the next lower slide. The connections from the lever 6 to said slides, therefore, are such as to shift to the rear only the slide $s^1$ when the first key is depressed (as shown in Fig. 2); while when the second key-lever is depressed the slides $s^1$ and $s^2$ will be shifted in unison, when the third key-lever $k^3$ is depressed the slides $s^1$, $s^2$ and $s^3$ will be shifted to the rear in unison, and so on until the fifth key $k^5$ is depressed when all of the slides $s^1$—$s^5$ will be shifted in unison to the rear. Thus, one, two, three, four or five small balls will be released and will drop by gravity through the discharge opening $c'$ according as the first, second, third, fourth or fifth of the keys $k^1$—$k^5$ is depressed. The keys $k^1$—$k^5$ may be returned to their normal positions in a very simple manner, as for example by means of a small coiled spring, such as 10, mounted in a suitable bore and working between a stop wall of the main vertical plate 11 of the framework and the rear end of the lowermost slide $s^1$, which is shown as having a washer against which the forward end of said spring presses. Because of the manner in which the slides are connected to each other by the stops 1, this spring serves to return any one or more or all of said slides to their forward position after such slide or slides has or have been moved to the rear by the depression of the corresponding key.

In order that the slides $s^1$—$s^5$ may receive in the registering apertures before described unit elements of one kind only—in this case small balls—it is important that provision be made at the proper point for supplying to said apertures said unit elements unmixed with unit elements of the other kind. In order to keep the two kinds of unit elements or balls separate at the point where said separation is necessary I provide at such point separate individual storage devices, one of which is adapted to contain unit elements or balls of one kind only and the other of which is adapted to contain unit elements or balls of the other kind only. These individual storage devices may be of any suitable size and kind and preferably form part of a circuit through which the unit elements or balls of different kinds are circulated either individually or together and assembled and distributed at different points therein. In the particular type of apparatus here specifically illustrated these individual storage devices are comparatively small and are shown as individual ball storage devices the main elements of which are indicated at S and S′ as short ball-storage tubes of the gravity-feed type, the former leading to and being normally in alinement with the registering apertures before described in the slides $s^1$—$s^5$, while the storage device or tube S′ is shown as normally registering with an aperture somewhat similar to those previously described but of larger diameter to receive large balls. As here illustrated the storage device S′ is partly in a tubular element connected to a central cover element 12 of the instrument, partly in said element 12 and partly in another slide $s^6$, which will be described later. It will be seen that normally balls in the storage reservoir S′ for large balls are vertically alined substantially in parallelism with the corresponding row of small balls, ready to be fed by gravity at the proper times to a common storage reservoir, such as that illustrated at C as a common reservoir connected with the discharge opening $c'$ into which the small balls are delivered as the keys $k^1$—$k^5$ respectively are depressed.

As before indicated, the object of feeding large balls is to separate successive small balls or groups of small balls from each other so as to obtain a proper spacing of the same. Any suitable means may be employed for separating the large balls from stock, that is from their individual storage reservoirs, in such a manner as to accomplish this object. Here the lowermost slide $s^1$ is shown as the principal means for effecting this separation and for bringing about the assembling or integration of small and large balls in proper order to produce the desired combinations of numbers in each of which the small balls representing different figures are separated by large balls in such a manner as to represent the desired whole number corresponding to the particular combination of unit elements. The slide $s^1$ shown has in the rear of the small-ball aperture an aperture 13 for the passage of large balls, and the two apertures in said slide are also shown as spaced at a considerably less distance apart than the two columns of balls descending from the individual storage reservoirs S and S'. The object of this is to permit such a movement of the slide $s^1$ as will afford a release of a small ball or a group of small balls on one stroke (that is the rear stroke) of the lowermost slide (or of the lowermost slide and one or more of the other slides $s^2$—$s^5$) and a release of a large ball on the forward or return stroke of the lowermost slide $s^1$, while preventing improper release of balls of either set. In other words, on each depression of a key, in the construction specifically illustrated in this case, the lowermost slide $s^1$ will always move to the rear and release the lowermost small ball. At this time the opening 13 in the slide $s^1$ will be in position to receive the lowermost large ball, and on the forward or return stroke of said slide it will carry with it and drop the lowermost large ball of the series through the opening $c'$. Of course, as before stated, when two or more slides move to the rear again two or more small balls will be released at once. In every case, after the completion of one key action, the descent of an additional small ball or large ball will be prevented until another key action takes place, this being due to the cut off action of the contacting horizontal faces of the slides and their supports. It will be noticed that the upper end of the discharge opening $c'$ is widened out sufficiently to receive first a small ball or balls and then a large ball on the return or forward stroke of the slide. Thus the release or separation of small and large balls in alternation is brought about by the two-stroke action of a key-lever, on the working or downward stroke of which at least one ball is separated and on the return stroke of which a large ball is separated; thus assuring the positive separation of the individual small balls or groups of small balls, representing the individual numerals of a given number, by at least one spacing ball of a suitable kind.

It is desirable to make provision also for the spacing of complete assembled combinations of large and small balls, that is of complete combinations integrated from different unit elements or balls, to distinguish the spacing of said completed combinations from the spacing of the different small-ball elements of a combination. This is accomplished in the particuar calling instrument shown by providing the additional slide $s^6$ before referred to and suitable means for operating said slide. The means here illustrated for effecting this operation comprises an extra key-lever, mounted on the common rod 4 carrying the other key-levers, and suitable connections from this additional key-lever to the slide $s^6$. The additional key-lever is indicated at $k^6$ and the key thereof is marked on the drawings "Space". It is shown as pivoted to the rod 4 and as having an extension or rock-arm, 14, the rear end of which is connected by a link, 15, to a crank 16 suitably connected to a rock-shaft 16' which, in turn, has secured thereto a second crank 17', which is slotted to straddle a pin, 17, carried by said slide $s^6$. The slide $s^6$ works between the central element 12 of the frame and the lower slide $s^1$, being guided in its movements between these parts. The thickness of the slide $s^6$ at its forward end is preferably twice the diameter of a large ball, in order that it may hold in the aperture therein for large balls (previously described) two large balls one above the other and deliver these through the opening 13 of the lowermost slide $s^1$ when the slide $s^6$ is moved forward on the depression of the space-key. Any suitable means (such as a spring) may be employed for returning this space-key and its connections together with the slide $s^6$ to their normal positions. Each time the space-key is operated it will be evident that two large balls will be fed into the common storage device C at the end of a combination that has just been set up and that these two large balls are additional to the large ball that is always released as the last element of a slide combination. It will be noticed that slide $s^6$ has a relatively long slot therein at 18 into which passes a pin or stud, 20, rising from the upper rear end of the slide $s^1$, this stop pin serving to locate the slide $s^6$ at the limits of its working and return strokes.

The mechanism just described constitutes a suitable means for selecting temporary combinations of movable elements and assembling them in position for successive utilization, and it also constitutes a suitable means for integrating from unit elements or balls contained in different storage reservoirs complete combinations and storing said combinations successively in a common storage reservoir until it is desired to make use of said combinations; but the means so far described in detail does not provide for the re-use of the different elements of these combinations, or for the distribution of the elements of assembled combinations, to the respective individual storage devices or reservoirs from which they were originally separated.

An important feature of my present invention in its relation to calling systems and various other types of apparatus is the provision of suitable means for re-using the unit elements or balls of assembled combinations after these combinations have been disassembled and properly distributed. Any suitable means may be employed for effecting this distribution and the distributing means may be located at any proper point between the point at which the assembled combinations are utilized and the point at which differentiated elements are separated from storage reservoirs or devices in proper order, substantially as before described, prior to their being brought together to form a complete combination. In the specific apparatus illustrated the movable elements or balls that circulate through the calling instrument are not distributed until just before they reach the point at which the individual reservoirs S and S' diverge from each other. In this case I have shown just above these two short storage devices another common storage device of considerable capacity adapted to receive and hold a considerable number of balls of combinations that have been through the instrument and completed the work required of them but have not been distributed. The distribution is here effected in a very simple manner, the balls descending by gravity through the common storage device, C', and passing over a plate containing a narrow slot, 21, Figs. 1 and 2, large enough to permit the small balls to pass through into the individual storage device S but not large enough to permit the large balls to drop through it, said large balls being deflected into the individual storage device S' in a manner that will be obvious.

Any suitable means may also be employed for bringing about the movement or transfer of the movable elements or balls employed to form combinations from one point to another in the machine, whether said movement be for the purpose of utilizing said elements, or for returning them to their initial positions after use, or otherwise. The preferred construction, as it is believed will be clear from the foregoing, is one in which the elements or balls are fed by gravity wherever possible. In the specific machine shown, however, gravity alone is not sufficient to carry these elements or balls through the circuit in which they are intended to travel and power-operated means for moving said elements and transferring them through certain portions of their path of travel is an important feature of the mechanism. In this specific calling instrument the assembled or integrated combinations of elements are utilized to control the action of an operated device, which is specifically illustrated as a circuit-controller for governing the transmission of a signal—that is a signal to an individual or station to be called. Power-operated means is illustrated in this specific instrument for the purpose of transferring such assembled elements or balls, preferably one at a time, to a point at which they are intended to exert their controlling action upon said operated device, that is, the circuit-controller in this specific apparatus. This power-operated means though it may be of any type suitable for accomplishing the desired result is shown as operative for releasing the unit elements or balls of a combination one at a time from a point near the bottom of the calling instrument and elevating them to substantially the highest point in said instrument whence they will usually be returned by gravity as before described to a point where they may be re-used. This power-operated means is preferably operated at a predetermined rate of speed so as to effect a substantially uniform timing of the transfer of successive balls. The preferred means employed by me at the present time for making this transfer is a power-operated balance-wheel, the oscillatory movement of which may be effected by power from any suitable source but preferably in one direction at least by power derived from an electro-magnet. The specific balance-wheel shown in the drawings is one in which the oscillation in one direction is brought about by the direct pull of an electromagnet upon an armature carried by the balance-wheel and in which the oscillation in the other direction is due to the release of power stored in a spring by the action of said electromagnet.

The specific balance-wheel embodied in the calling instrument shown is designated by W. It carries at a suitable point near its periphery an armature segment, 22, of such length and so positioned as to coöperate properly with an electromagnet, such as E, suitably mounted on the base 2 of the machine. The balance-wheel as a whole is supported to turn about an axis which is substantially the central horizontal axis of the machine from the front to the rear thereof. This axis is indicated at 23. The movement of the balance-wheel in one direction is controlled directly by the electro-magnet E acting upon the armature segment 22 and in the other it is controlled indirectly by said electromagnet by power stored by said magnet in a spring, 24, contained in a casing, 25, projecting rearwardly from the face of the balance-wheel W. This spring is fastened at its opposite ends to fixed and movable points respectively one of which is a pin or stud 24' and the other of which is a corresponding pin or stud 26. The pin 24' is shown as the fixed pin and may be adjustable if desired to different positions. The tension of the spring may be varied as desired by means of a handle, 25', which is operatively connected to the pin 24' by which a relative turning movement may be obtained between the parts to which the ends of the spring 24 are connected. The stud or pin 26 is one of a series of six similar studs, all designated by the same reference character 26, employed for starting the movement of the balance-wheel. Any suitable means may be employed for this purpose, as for example a gear-segment, 27, pivoted, at 28, and connected, as by a link 29, to a rock arm, 30, secured to a rock-shaft, 31, carrying at its forward end a handle, 32, for operating the gear-segment 27 to turn the balance-wheel on starting the operation of the instrument. Assuming for the present the proper closing of a circuit through the electromagnet E at predetermined times (which circuit will be hereinafter described) it will be understood that when the balance-wheel W is pulled in one direction, by the electro-magnet acting on the armature 22 in opposition to the spring 24, said spring will be wound up, and when the circuit of the electromagnet is broken and movement of the balance-wheel in the path controlled directly by it is ended the spring will then become effective to oscillate said balance-wheel in the opposite direction. The movement of said balance wheel in one direction is utilized in this instrument to transfer a unit element or ball from a point near the bottom of the instrument and at one side of the central vertical plane to a point near the top of the instrument and at the other side of said vertical plane. The element shown for this purpose is a projection forming a transfer element, 33, at the periphery of the balance-wheel, this transfer element being movable through an arc of about 180 degrees from said lower position to said upper position.

In the regular operation of the machine unit elements or balls from a common storage device C are delivered through an opening 34 (see Fig. 5) to the end of a rock-arm or lever, 35, having a cam so shaped as to receive a ball properly delivered to it and transfer said ball to a channel, 35', between the main vertical frame 35'' of the machine and the periphery of the balance-wheel, which channel is so shaped and inclosed as to permit large and small balls to be carried around in it one at a time by the transfer element 33, after each such ball has been elevated by the rock-arm 35 to the proper position in front of said transfer element 33. The rock-arm 35 which raises the balls successively into position to be carried around by the transfer element 33 of the balance-wheel is secured in this case to a rock-shaft, 36, operated by another rock-arm, 37, connected in this case by a long link, 38, to a lever, 39, pivoted, at 40, at a suitable point on the framework, see Figs. 1 and 3, and constituting in this construction a switch for opening and closing the main break in the circuit of the electromagnet E. Near its free end this lever 39 is shown as carrying a carbon contact, 41, which coöperates with a corresponding fixed carbon contact, 42, on the framework. The object of providing carbon contacts for the main break is to eliminate sparking as far as possible, especially at the second break in the circuit, and the manner in which this is done will be hereinafter described. The lever 39 is shown as having a depending cam-shaped projection or fin, 43, the under side of said projection being suitably shaped to form a cam surface coöperative with an oscillatory pin, 26', which pin, when the balance-wheel is turned in one direction, rides over the face of the cam 43 and raises said cam and the lever 39, together with the contact 41, and opens the main break at 41—42, while, when said balance-wheel is turned in the other direction, said lever and its movable contact are swung in the opposite direction to close said main break, as will be clear from the drawings. The lever 39 has two short arms and as here illustrated forms practically a three-armed lever, the depending arm 39' of which carries a spring-pressed by-pass pawl, 44, in the path of movement of the pin 26', which pin is carried by the balance wheel, said pin in one direction of its oscillation passing outside the pawl, and in the other direction of movement passing inside of said pawl when the main break is open and the arm 39' has been swung in toward the axis of the machine. The other of the three arms of the lever 39, is shown, at 39'', as a wedge-shaped device adapted to be engaged in either direction of movement of said lever by a moderately strong spring, 45, having a corresponding wedge-shaped end one of the faces of which is adapted to engage one of the faces of the wedge 39'' and hold it when the lever 39 is in position to open the main break and the other of which is adapted to engage the other face of said wedge 39'' when said lever is in position to close the main break at 41—42. The employment of this additional friction at these two points in the cycle of movement of the mechanism serves to steady the operation of the movable parts and also assures the holding of the lever 39 in the desired open or closed position, as the case may be, thus giving a positive control of the relative positions of the contacts 41—42. It is, of course, to be understood that the by-pass pawl 44 permits the passage of the pin 26' and the resultant throwing of the wedge 39″ into either its full line or its dotted line positions, as illustrated in Fig. 3, of the drawing, so that the contacts 41 and 42 will either be held in open or closed relationship.

Figure 12:
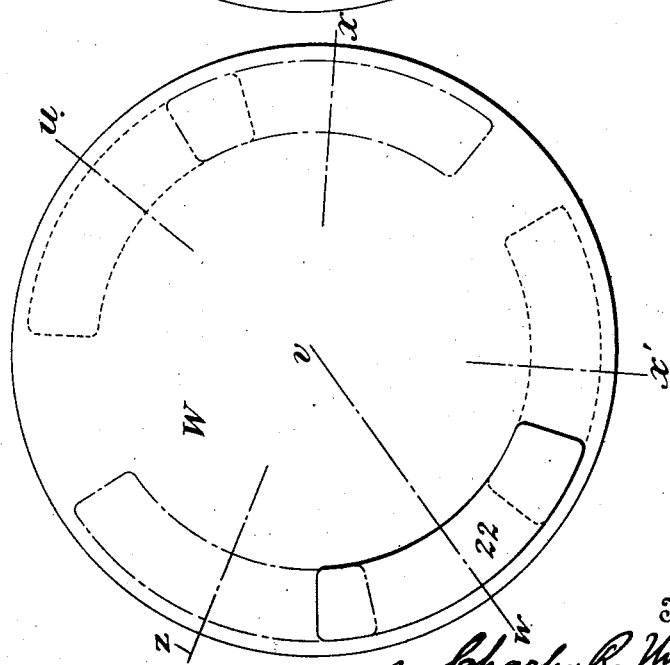
Fig. 12 is a diagrammatic view of the balance-wheel illustrating various positions of said wheel at the principal points in its cycle of oscillation, which points will be hereinafter more particularly described.

Assuming that the device is in inoperative position, the contacts 41 and 42 separated, and the arms 39′ and 39″ in their dotted position, as shown in Fig. 3, and the armature segment in its position z, indicated by dot and dash lines in Fig. 12, the starting of the apparatus by the handle 32, through its shaft 31 and link and lever connections 29 and 30 and segment 27, will rotate the balance wheel W, and with it the pin 26′, in a clockwise direction. As the pin 26′ travels in this direction it will pass outside of the pawl 44 of the arm 39″; as shown in dotted lines in Fig. 3. During this movement the spring 24, Fig. 11, is energized by the manually operated mechanism as described, causing the reverse movement of the balance wheel W, and also the pin 26′, upon the automatic disconnection of the segment 27 of the manually operated mechanism. On the reverse rotation of the pin 26′ about its axis 23, said pin will engage the inside of the pawl 44, and thereby shift the arms 39, 39′ and 39″ to their full line positions, as shown in Fig. 3, closing the circuit at the contact points 41 and 42. At this time the armature segment 22 is in position u, and as the circuit is closed by the meeting of the contacts 41 and 42, as herein described, the electro-magnet E will be energized. The armature segment being in position u, will be attracted by the magnet E, continuing the rotation of the balance wheel W sufficiently to cause the pin 26′ to engage the cam 43, carried by the arm 39, breaking the contact and deënergizing the magnet. During this counter-clockwise movement of the balance wheel W, the spring 24 is energized so that as soon as said contact is broken the spring will cause a rotation of the balance wheel W in a clockwise direction, which was initially caused by the manually operated mechanism hereinbefore described, the oscillation of the wheel W from now on being continued by the alternate action of the magnet and the spring.

Each time that a large or small ball is transferred by the element 33 from the rock-arm 35 to the upper part of the balance-wheel and beyond the vertical central plane thereof it will be delivered in this construction to a point in the channel 35′ adjacent to a light detent spring, such as 46, by which said ball will be stopped and further movement of it prevented for the time being.

In the calling instrument illustrated each ball so located, whether a small ball $b$ or a large ball $b'$, is intended on the next succeeding swing of the balance-wheel in the same direction to be forced beyond the detent spring 46, whence in the regular operation of the machine it will pass to the end of a channel, 47, (see Fig. 6) and hence into a passage, 48, leading directly back to the common storage reservoir C′. A simple means is shown herein for forcing a ball at the point of the detent spring 46 past said spring and permitting it to return to the common stock of balls as just described. The means shown, Fig. 3 comprises a cam, 49, on the balance-wheel and a lever, 50, pivoted to a suitable point on the vertical frame near the top of the machine and adjacent to the free end of the spring 46, which lever has a short lower arm in the path of said cam 49 and a longer, forwardly-extending arm having a finger 50′, (Figs. 3 and 6) in position to strike a ball located as just described at the free end of the spring 46 and force it positively past said spring. The lever 50 may be held in its normal position with its short arm on the surface at the bottom of the rise of the cam by a suitable spring 49′.

It will be seen from the foregoing that the oscillation of the transfer element 33 in one direction by the balance-wheel is sufficient to transfer either a large or a small ball from the lower to the upper part of the instrument once during each complete oscillation of the balance-wheel, and that the operation is such that on the next oscillation, and a little earlier in the stroke, the ball so positioned is forced past the end of the detent spring 46. The relation of the movements of the parts 33 and 50 is such that said lever 50 drives one ball through into the channel 47 just before the next succeeding ball is brought to the end of its transfer movement by the element 33.

After a series or combination of elements or balls has been separated from stock in any embodiment of my invention such series or combination will of course be utilized to accomplish some definite result. In this particular machine shown and in various other types of machines in which the invention may be embodied such series or combination will control the action of a suitable element to be operated. Here this control is by the individual elements or balls of each combination assembled or integrated from the unit elements described. Furthermore a differentiation in this control is obtained from different combinations, this differentiation being effected by the different kinds of unit elements. Thus in this calling instrument the small balls are intended to pass a suitable operated element without acting upon it, while each large ball is intended to move said operated element when it passes the same. The specific operated element controlled by such combinations and the elements thereof in this instrument is a circuit-controller governing the second break (before referred to) in the circuit of the electromagnet E, said circuit being intended here to have not only a main break opened and closed periodically and regularly by the timing means or balance-wheel, etc., but also to have a second break which will be opened or closed respectively by a large or small ball. A suitable circuit-controller is shown, at 51, as pivoted on the main vertical frame at the top of the instrument, it being movable about an axis, 52, and its movable contact being preferably an adjustable screw 53. A coöperative fixed contact carried on said framing is shown at 54. Here the circuit-controller, which is in the form of a lever, also carries a depending arm or fin, 55, having a cam-shaped under surface of such contour as to permit small balls to pass by it without raising the circuit-controller lever 51 when the contacts 53—54 are in engagement, but which will not permit the passage of large balls in this manner. Instead, when a large ball is brought into the zone of this cam surface said large ball, which is positively actuated by the transfer element 33 to the point where it comes in contact with the spring 46, serves as a means for positively raising the lever 51 and hence opening at 53—54 the second break in the circuit of the electromagnet E. This is the manner in which in this specific instrument an electrical differentiation in the control of the circuit of said electromagnet is obtained; and this differentiation also extends to the signal transmitted by said circuit to a suitable receiver or calling device located at a station to be called. The particular differentiation made by this specific instrument is the making or breaking of an electrical contact, which in turn controls corresponding makes and breaks in signals transmitted from the calling instrument to a distant station. Said makes and breaks are here the makes and breaks of an electric circuit connecting said calling instrument or signal-transmitter with one or more suitable receiving instruments located at a distant point or points. Each make of the circuit occurs upon the transfer of a small ball $b$, and in this specific apparatus is effected by the movable circuit-controller 39 at its contact 41, and each break of the circuit is controlled by a large ball. Assuming as before that the number 123 is the call to be sent, then when a small ball is forced past the cam 55 it will not open the break 53—54 and an electrical impulse will be transmitted (assuming the break 41—42 to be closed). The next ball being a large ball when it is forced past the cam 55 it raises the same sufficiently to open the circuit at 53—54, and hence no electric impulse will be transmitted. In the same manner on the passage of the next two small balls in succession two electric impulses are sent, while on the passage of the next large ball or spacing ball there is a break in the circuit. Similarly, on the passage of the next three small balls, three successive electrical impulses are sent from the signal-transmitter or calling instrument, while the final large ball of the combination causes at the proper point the opening of the circuit at the break 53—54.

The specific circuit of the calling instrument shown, and of one or more receiving devices responsive to signals transmitted therefrom, is illustrated in Fig. 14, in which there is shown a source of energy, indicated by D, from which a conductor leads to the main movable contact 41, the other side of the source being connected to a line conductor 56. To this conductor one terminal of the electromagnet E is shown as connected, while the other terminal of said magnet is connected to the fixed contact 42 of the main break in the circuit by a conductor, 57. This terminal or fixed carbon contact 42 is shown as connected with the terminal 53 of the second break (controlled by the balls) by a conductor, 58, and the fixed contact 54 at the second break is connected to another line conductor, 59, between which and the line conductor 56 receivers or calling instruments, such as R, are shown connected in parallel branches of the line circuit. It will be evident from this diagram that the two breaks at 41—42 and 53—54 are connected in series when both are closed, at which time a signal will be transmitted. If, however, a large ball, such as $b'$, is passing the contact 53 said contact will be shifted to open the break at 53—54 and no electrical impulse will pass through any receiver. The timing of the movements of the contacts 41—53, the former controlled by the balance-wheel W and the latter by a passing ball, is such in the particular calling instrument illustrated that the break 41—42 is always open when the break 53—54 is about to be opened or closed, so as to prevent sparking at said point.

The period of oscillation of the balance-wheel and the parts carried thereby may be of course any that may be desired (within limits) and this timing may be regulated in any one of various ways. In all cases, however, it will be seen that the balance-wheel provides for a regular movement for correspondingly controlling signals transmitted. The extent of oscillation of the balance-wheel when the armature 22 thereof is under the influence of the energized magnet E may also be such as desired. Here in order to start the machine the handle 32 is pulled through an arc which will move the balance-wheel through the arc in Fig. 12 included between the lines $z$ and $x$, that is through the arc $z \, u \, x$, the line $z$ representing the poised position of the balance-wheel and $x$, the limit of movement in this direction. The other limit of movement is indicated at $x'$, while the line $u$ indicates the point at which the circuit is closed. The positions of the armature 22 corresponding to those shown by the radial lines are indicated by dotted or dot-and-dash lines which indicate the form of the armature. The circuit is made when the armature 22 is in the position indicated by the line $u$ and broken when in the position indicated by the line $w$. Thereupon balance-wheel W, which was first swung clockwise to start it, and which on the making of the circuit at the position $u$ was swung in the opposite direction by the pull of the magnet, is swung back clockwise by the release of the power stored up in the spring 24 by the magnet E on the counter-clockwise swing of the balance-wheel. Of course the operation of the lever 39 and the rock-arm 35 by the action of the pin 26' will take place at predetermined times in correspondence with the oscillatory movements of the balance-wheel; and the movements of the transfer element 33 and the lever 50, as well as the opening of the break 53—54, will take place in correspondence with such movements.

The mechanism, etc., hereinbefore specifically described is sufficient for the purpose of assembling temporary combinations of elements, such as unit elements, and utilizing the same in accordance with my present invention, whether said elements are to be used for the purpose of controlling the action or movement of some other means, or otherwise used, and it is also sufficient for the purpose of separating from different storage devices for differentiated elements a series or combination of elements, marshaling them in single file and utilizing the elements of said single file in any of the various ways contemplated by me and hereinbefore set forth. Said mechanism is not sufficient, however, as thus far specifically described, to permit a series or combination that has been assembled and once used to be used again for any purpose, and it is not sufficient to permit such assembled elements to be utilized in any order other that in which they have been assembled. As an important feature of my invention is the provision of means for repeating the use of a particular combination or combinations, and another important feature is the utilization of such combinations in a different order from that of their assembling, and as it is desirable to embody both of these features in a machine of the type illustrated herein, the specific calling instrument shown is so constructed as to permit of a repetition of the signal by a given combination and is also constructed to permit the signals to be transmitted in a different order from that in which they are set up by the operator.

In order to utilize combinations separated from the storage devices S and S' in some other order than that in which they follow one another into the common storage device C, as previously described, I provide means for shifting said storage reservoir C out of operative relation with the discharge passage $c'$ and for bringing into operative relation therewith a special storage device, which may be a comparatively short channel or tube, $C^2$, in which storage device may be assembled one or more special series or combinations of elements. The spiral storage device of considerable capacity designated by C and the special storage device $C^2$ are intended to be shifted into and out of action alternatively, the regular storage device C being normally in position to receive assembled or integrated combinations, as shown in Fig. 5, while when the parts are shifted to the position shown in Fig. 6 the special storage device $C^2$ is brought into action. In order to permit this, the means for supporting the storage devices C and $C^2$ is shown as having a movement of oscillation about the longitudinal axis 23 of the machine, and the adjacent faces of the elements containing or supporting the discharge passage $c'$ and the storage devices C and $C^2$ are shown in the drawings as defined by arcs of a circle having the axis 23 as a center, in order that said parts may turn readily and at the same time permit the proper covering and uncovering of the passages by the walls 3'' and 60' of the parts 3 and 60 (see Fig. 2). These faces 3'' and 60' serve to cut off the receiving end of the regular storage device C in one position, and in the other position to cut off the special storage device $C^2$, from communication with the ball passages above them.

Suitable means will also be provided in connection with a mechanism of the type just described for cutting off connection alternatively between the discharge ends of the storage devices C and $C^2$ and the entrance to the ball channel 35'. In the construction illustrated here I have accomplished this by combining with the oscillatory member 60 carrying said storage devices an oscillatory element for controlling the repetition of the use of balls, such oscillatory element being so constructed as to permit the repetition of the use of combinations stored in the regular storage device C and also of a combination in the special storage device $C^2$ and also the repetition of combinations that have been repeated. The principal element shown here for controlling these various functions is a plate of sufficient thickness to have ball-passages through which large and small balls may travel, such a plate being indicated at $r$, and having a handle $r'$, by means of which it may be shifted to its various positions. This plate is mounted for oscillation about the central horizontal axis 23 of the machine and may be held in place by friction between adjacent vertical walls of the frame. It is shown as having in its upper and lower edges (which it will be noted are respectively adjacent to the receiving and discharge points of the balance-wheel) openings or passages 61, 62, 63 and 64, 65, 66. The three positions of this plate correspond respectively to the regular position of the parts, in which as shown in Fig. 5 the regular storage device C is in communication with the passage $c'$, to the position of the parts in which the special storage device $C^2$ is in communication with the passage $c'$, as shown in Fig. 6, and to a position in which neither of said storage devices C and $C^2$ is in communication with said passage $c'$.

In the normal operation balls will go through the opening 65 and the opening 34, as shown in Fig. 5, and be picked up and carried around by the transfer element 33 of the balance-wheel and returned to the upper common storage device $C'$. When the parts are in position for the special storage device to be used, as shown in Fig. 6, the balls will go through the opening 66 and will be similarly transferred and then returned to storage device $C'$. In either of the positions shown in these two views it may be desired to prevent the return of the balls to the storage device $C'$ and to provide for a repetition of the action of any given combination or combinations. Any suitable means may be employed to accomplish this result. Here a simple type of valve is shown, at 67, which in its normal setting permits the balls to go through a passage, 67', to said storage device $C'$, but which when turned to another position diverts said balls through a passage, 67", of the valve into a passage or channel, 68, the discharge end of which is indicated at 68', and lies close to one face of the plate r, in position to coöperate with suitable repeating means preferably formed in the plate r (see Fig. 1).

The principal element of this repeating means is shown as a channel or passage, 69, having at its receiving end three branches terminating in properly spaced receiving openings, 70, 71' and 72, while the discharge end of the repeating channel $C^2$ terminates in the opening 64 previously mentioned. When the valve 67 is so turned as to divert balls that have been once used into the passage 68, if the parts are in the regular setting shown in Fig. 5 said balls will be delivered one at a time through the openings 68' and 71 into the channel 69, in which they will be stored up temporarily, owing to the fact that the opening at 64 at such time is closed by the adjacent face of a vertical element of the frame-work. If the parts are in the position shown in Fig. 6, and a special combination is being used and the valve 67 is in position to divert said balls through the channel 68, said balls will pass one at a time through the openings 68' and 72 into the repeating channel 69, where they will be stored temporarily, owing to the fact that the opening 64 is still masked by said vertical surface of the framing.

In the third setting of the parts, shown in Fig. 7, the balls stored up in the repeating channel 69 may be used again, and this whether they came from the normal or regular common storage device C or from the special storage device $C^2$. In this position of the parts it will be seen that the opening 64 at the delivery end of the repeating channel 69 is not masked, but that it is in communication with an opening 73, passing transversely into the frame member adjacent to the ball channel 35', and that the opening 73 permits balls from the repeat channel 69 to drop onto the upper part of the rock-arm 35, whence they travel down the cam surface to the lower end of said rock-arm where they are lifted by the rock-arm 35 in the manner before described into position to be engaged by the transfer element 33 and carried around to the point of use. Only one ball at a time can be received by the rock-arm 35 and fed in this manner. It will be noticed that where a regular or a special combination is set up in the repeat channel 69 by properly diverting regular or special combinations away from the storage device $C'$ in the manner just described, any such combination may be passed through the machine once and returned to such storage device $C'$ by properly setting the valve 67, or its action may be repeated indefinitely by setting said valve in positon for diverting said balls away from said storage device $C'$, in which case the balls after being used the second time will pass through the opening 68' and through the opening 70 back into the repeat channel 69 and may be used over and over again indefinitely, owing to the fact that in this third setting of the parts (Fig. 7) the opening 64 is not masked but is in position to permit balls to travel through the machine continuously.

The foregoing description of one way in which one specific type of apparatus may be made to embody the invention will serve to indicate what the principal important features of the invention are and how they may be put to practical use; but as before stated the mechanism specifically shown and described illustrates but one way in which one of the many different types of apparatus to which my invention is applicable may be made and operated.

What I claim is:

1. A selecting mechanism, comprising a stock of unit elements of different kinds, means for integrating from said stock of unit elements different combinations, an operated means, the operation of which is rendered effective by certain of said elements, and selective means for either restoring the unit elements to said stock or causing them to again affect the operated means.

2. Key-operated selecting mechanism, comprising a stock of unit elements of different kinds, and a two-stroke key-operated device for integrating from said stock of unit elements on different strokes different elements of a combination.

3. Key-operated selecting mechanism, comprising a stock of unit elements of different kinds, and a plurality of differentiated two-stroke key-operated devices for integrating from said stock of unit elements on different strokes different elements of a combination.

4. A selecting mechanism, comprising a storage device, a stock of unattached unit elements therein, means for integrating from said stock of unit elements a combination, an operated electrical device controlled by said combination, and selective means for either restoring said combination to said storage device or causing the same to again control the operated electrical device.

5. A selecting mechanism comprising a stock of unattached unit elements, means for integrating from said stock of unit elements at different times different combinations having common unit elements, a circuit-controller governed by each of said combinations, and selective means for either restoring the unit elements of said combinations to stock or causing them to again affect the circuit controller.

6. A selecting mechanism, comprising a stock of unit elements of different kinds, storage devices for containing the elements of each kind, means for integrating from said stock of elements different combinations, each combination embodying elements of different kinds, an operated means, the operation of which is rendered effective by elements of one kind, and selective means for either distributing the units of said combinations to their respective storage devices or causing them to again affect the operated means.

7. A selecting mechanism, comprising a stock of unit elements of different kinds, a storage device for the elements of each kind, means for integrating from said stock of unit elements different combinations, each embodying units of different kinds, an operated means, the operation of which is rendered effective by certain elements of each combination, and selective means for either distributing the unit elements of said combinations to their respective storage devices or causing them to again affect the operated means.

8. A selecting mechanism, comprising a stock of unit elements of different kinds, separate storage devices for the elements of each kind, means for integrating from said stock of unit elements different combinations, each embodying units of different kinds, an operated means having a selective action controlled by and corresponding to the different combinations of unit elements, and selective means for either distributing the respective unit elements of said combinations to their respective storage devices or causing them to again affect the operated means.

9. A selecting mechanism comprising a storage device containing a stock of unit elements of one kind, a second storage device containing a stock of elements of a different kind, means for integrating from said unit elements combinations embodying unit elements of both kinds and for marshaling said combinations in single file, operated mechanism, the operation of which is rendered effective by elements of one kind, and selective means for either distributing the elements to their respective storage devices or causing them to again affect the operated mechanism.

10. A selecting mechanism, comprising a pair of ball-storage devices for balls of different sizes, means for separating from said ball-storage devices a combination of said balls, means for utilizing said combination, means for repeating said last-named action, and selective means for causing said repetition and for distributing said balls to their respective storage devices after said repetition.

11. A selecting mechanism, comprising a pair of storage devices for movable elements of different kinds, means for separating from said storage devices a combination of said elements, an operated device controlled by said combination, means for repeating the action of said combination upon said operated device, and selective means for causing said repetition and for distributing the elements of said combination to their respective storage devices after said repetition.

12. A selecting mechanism, comprising a pair of storage devices for movable elements of different sizes, means for separating from said storage devices a combination of said elements, an electrical contact controlled by said combination and governed by elements of one size, means for repeating the action of said combination upon said contact, and selective means for causing said repetition and for distributing the elements of said combination to their respective storage devices after such repetition.

13. A selecting mechanism, comprising a pair of storage devices for movable elements of different kinds, means for separating from said storage devices a combination of said elements, means for utilizing said combination, and selective means for repeating said last named action, said repeating means being pivoted to swing into and out of its different selective positions.

14. A selecting mechanism comprising a pair of individual storage devices for elements of different kinds, means for separating from said storage devices different combinations of said elements, a pair of common storage devices, each adapted to receive said combinations of elements, means for bringing said common storage devices into action selectively, and operated mechanism, the operation of which is rendered effective by certain elements of the combinations.

15. A selecting mechanism, comprising a pair of individual storage devices for movable elements of different sizes, means for separating from said storage devices different combinations of said elements, a pair of common storage devices each adapted to receive said combinations of elements, means for bringing said common storage devices into action selectively, operated mechanism, the operation of which is rendered effective by certain elements of the combinations, and means for distributing the elements of said combinations to their respective individual storage devices.

16. A selecting mechanism, comprising a pair of individual storage devices for movable elements of different sizes, means for separating from said storage devices different combinations of said elements, a pair of common storage devices each adapted to receive said combinations of elements, means for bringing said common storage devices into action selectively, and operated mechanism, the operation of which is rendered effective by certain elements of the combinations.

17. A selecting mechanism, comprising a pair of individual storage devices for movable elements of different sizes, means for separating from said storage devices different combinations of said elements, a pair of common storage devices each adapted to receive said combinations of elements, means for bringing said common storage devices into action selectively, and an electrical contact controlled by said combinations and governed directly by elements of one size.

18. A selecting mechanism, comprising a storage device containing a stock of unit elements of one size, a second storage device containing stock of unit elements of another size, means for integrating from said unit elements a combination embodying unit elements of different sizes, operated mechanism, the operation of which is rendered effective by certain elements of said combinations, means for repeating the action of said combination, and selective means for either distributing the units of said combination to their respective storage devices or causing them to again affect the operated mechanism.

19. A selecting mechanism, comprising an assembling and distributing circuit at one point in which are separate storage devices for different distributed unit elements and at another point in which is a common storage device for assembled unit elements of different kinds; in combination with means for assembling in said common storage device a combination of different unit elements, operated mechanism, the operation of which is rendered effective by certain elements of said combinations, and selective means for either distributing said unit elements to their respective storage devices or causing them to again affect the operated mechanism.

20. A selecting mechanism, comprising a closed assembling and distributing circuit at one point in which are separate storage devices for different distributed unit elements and at another point in which is a common storage device for assembled unit elements of different kinds; in combination with means for assembling in said common storage device a combination of different unit elements, operated mechanism, the operation of which is rendered effective by certain elements of said combinations, and selective means for either distributing said unit elements to their respective storage devices or causing them to again affect the operated mechanism.

21. A selecting mechanism, comprising an assembling and distributing circuit at one point in which are separate storage devices for different distributed unit elements and at another point in which is a common storage device for assembled unit elements of different kinds; in combination with means adjacent the receiving end of said common storage device for assembling therein a combination of different unit elements, operated mechanism at the delivery end of said common storage device, the operation of which is rendered effective by certain elements of said combination, and selective means for either distributing said unit elements to their respective storage devices or causing them to again affect the operated means.

22. A selecting mechanism, comprising an assembling and distributing circuit at one point in which are separate storage devices for different distributed unit elements and at another point in which is a common storage device for assembled unit elements of different kinds; in combination with means adjacent the receiving end of said common storage device for assembling therein a combination of different unit elements, a circuit-controller at the delivery end of said common storage device and controlled by said combination, and selective means for either distributing said unit elements to their respective storage devices after passing said circuit-controller or causing their return to said common storage device to again affect the circuit-controller.

23. A selecting mechanism, comprising an assembling and distributing circuit at one point in which are separate storage devices for different distributed unit elements of different kinds and at another point in which is a common storage device for assembled unit elements of different kinds which storage device has a fixed element and a movable transfer element; in combination with means for assembling in the fixed element of said common storage device a combination of different unit elements, operated mechanism adjacent to said movable element, the operation of which mechanism is rendered effective by certain elements of said combination, and selective means for either distributing said unit elements to their respective storage devices after passing said operated device or causing their return to said common storage device to again affect the circuit controller.

24. A selecting mechanism, comprising an assembling and distributing circuit at one point in which are separate storage devices for different distributed unit elements of various kinds and at another point in which is a common storage device for assembled unit elements of different kinds which storage device has a fixed element and an oscillatory transfer element; in combination with means for successively assembling in the fixed element of said common storage device a combination of different unit elements, operated mechanism adjacent to said oscillatory transfer element, the operation of which mechanism is rendered effective by certain elements of said combination, and selective means for either distributing said unit elements to their respective storage devices after passing said operated device or causing their return to said common storage device to again affect the operated device.

25. A selecting mechanism, comprising an assembling and distributing circuit at one point in which are separate storage devices for different distributed unit elements of various kinds and at another point in which is a common storage device for assembled unit elements of different kinds which storage device has a fixed element and an oscillatory transfer element; in combination with means for assembling in the fixed element of said common storage device a combination of different unit elements, means for imparting a regular movement of oscillation to said transfer element, operated mechanism adjacent to the delivery point of said oscillatory transfer element, the operation of which mechanism is rendered effective by certain elements of said combination, and means for distributing said unit elements to their respective storage devices after passing said operated device.

26. A selecting mechanism, comprising an assembling and distributing circuit at one point in which are separate storage devices for different unit elements of various sizes and at another point in which is a common storage device for assembled unit elements of different sizes; in combination with means for assembling in said common storage device a combination of different unit elements, continuously-operated, oscillating means for delivering the unit elements of said assembled combination to a device to be operated, a selective mechanism responsive to each element so delivered, and including a device responsive directly to unit elements of one size, and selective means for distributing said unit elements to their respective storage devices after passing said selective operated device.

27. A selecting mechanism, comprising an assembling and distributing circuit at one point in which are separate storage devices for different distributed unit elements and at another point in which is a common storage device for assembled unit elements of different kinds; in combination with means for assembling in said common storage device a combination of different unit elements, electro-mechanical means for delivering the unit elements of said assembled combination to a circuit-controller, selective circuit-controlling mechanism operable for each element so delivered and responsive to unit elements of different kinds, and selective means for either distributing said unit elements to their respective storage devices after passing said selective circuit-controlling mechanism for causing their return to the common storage device to again affect the circuit controlling mechanism.

28. A selecting mechanism, comprising an assembling and distributing circuit at one point in which are separate ball-storage devices for distributed balls of different sizes and at another point in which is a common ball-storage device for assembled balls of different sizes; in combination with means for assembling in said common ball-storage device a combination of balls of different sizes, a circuit-controller in the path of assembled balls and responsive to balls of one size, and selective means for either distributing said balls to their respective ball-storage devices or causing their return to said common ball storage device to again affect the circuit controller.

29. A selecting mechanism, comprising an assembling and distributing circuit at one point in which are separate ball-storage tubes for distributed balls of different kinds and at another point in which is a common ball-storage tube for assembled balls of different kinds; in combination with means for assembling in said common ball-storage tube a combination of balls of different kinds, an operated device controlled by said assembled balls, and selective means for either distributing said balls to their respective ball-storage devices or causing their return to said common storage device to again affect the circuit controller.

30. A selecting mechanism, comprising an assembling and distributing circuit at one point in which are separate gravity-feed ball-storage tubes for distributed balls of different kinds and at another point in which is a common gravity-feed ball-storage tube for assembled balls of different kinds; in combination with ball-releasing means for assembling in said common ball-storage tube a combination of balls of different kinds, an operated device controlled by said combination, and selective means for either distributing said balls to their respective ball-storage tubes or causing them to again affect the operated device.

31. A selecting mechanism, comprising an assembling and distributing circuit at one point in which are separate storage devices for different distributed unit elements, and at another point in which unit elements of different kinds are assembled; in combination with means for assembling at said second point a combination of different unit elements, an operated device controlled by said combination, a repeating device shiftable into and out of a position where it forms a part of said circuit, and means for distributing the unit elements of said combination to their respective storage devices.

32. A selecting mechanism, comprising an assembling and distributing circuit at one point in which are separate storage devices for different distributed unit elements and at another point in which is a common storage device for assembled unit elements of different kinds; in combination with means for assembling in said common storage device a combination of different unit elements, an operated device controlled by said combination, a repeating device shiftable into and out of a position where it forms a part of said circuit between said common storage device and the distributing means, and means for distributing the unit elements of said combination to their respective storage devices.

33. A selecting mechanism, comprising a storage device containing unit elements of one kind, a second storage device containing unit elements of another kind, a plurality of key-operated devices each operative for separating from said first storage device a different number of unit elements of one kind, and means for separating from said second storage device a number of unit elements of the other kind after each such separation of an element or set of elements of the first kind.

34. A selecting mechanism, comprising a storage device containing balls of one kind, a second storage device containing balls of another kind, a plurality of key-operated devices each operative for separating from said first storage device a different number of balls of one kind, and means for separating from said second storage device a ball of the other kind after each such separation of a ball or set of balls of the first kind.

35. A selecting mechanism, comprising a gravity-feed storage device containing unit elements of one kind, a second gravity-feed storage device containing unit elements of another kind, a plurality of key-operated devices each operative for releasing a different number of unit elements of one kind, and means for releasing a unit element of the other kind after each release of an element or set of elements of the first kind.

36. A selecting mechanism, comprising a storage device containing unit elements of one kind, a second storage device containing unit elements of another kind, a plurality of key-operated devices each operative for separating from said first storage device a different number of unit elements of one kind, means for separating from said second storage device a number of unit elements of the other kind after each such separation of an element or elements of the first kind, and a selective device controlled by the combinations of said unit elements and responsive directly to unit elements of one kind.

37. A selecting mechanism, comprising a gravity-feed ball-storage device containing balls of one kind, a second gravity-feed ball-storage device containing balls of another kind, a plurality of key-operated devices each operative for releasing a different number of balls of one kind, and means for releasing a ball of the other kind after each release of a ball or set of balls of the first kind.

38. A selecting mechanism, comprising a storage device containing unit elements of one kind, a second storage device containing unit elements of another kind, and a plurality of two-stroke key-operated devices each operative on its first stroke for separating from said first storage device a different number of unit elements of one kind and on its second stroke for separating from said second storage device a unit element of the other kind.

39. A selecting mechanism, comprising a storage device containing balls of one kind, a second storage device containing balls of another kind, and a plurality of two-stroke key-operated devices each operative on its first stroke for separating from said first storage device a different number of balls of one kind and on its second stroke for separating from said second storage device a ball of the other kind.

40. A selecting mechanism, comprising a storage device containing unit elements of one kind, a second storage device containing unit elements of another kind, a plurality of two-stroke key-operated devices each operative on its first stroke for separating from said first storage device a different number of unit elements of one kind and on its second stroke for separating from said second storage device a unit element of the other kind, and a separate key-operated device for separating from said second storage device a unit element of said second kind.

41. A selecting mechanism, comprising a storage device containing balls of one kind, a second storage device containing balls of another kind, a plurality of two-stroke key-operated devices each operative on its first stroke for separating from said first storage device a different number of balls of one kind and on its second stroke for separating from said second storage device a ball of the other kind, and a separate key-operated device for separating from said second storage device a plurality of balls of said second kind.

42. A selecting mechanism, comprising a gravity-feed ball-storage device containing balls of one kind, a second gravity-feed ball-storage device containing balls of another kind, a plurality of two-stroke key-operated devices each operative on its first stroke for releasing from said first storage device a different number of balls of one kind and on its second stroke for releasing from said second storage device a ball of the other kind, and a separate key-operated device for releasing from said storage device a plurality of balls of said second kind.

43. A selecting mechanism, comprising a stock of freely movable balls of two different sizes each of which sizes is contained in a different ball-storage device, means for separating different combinations of balls from said stock, an electric selecting circuit having a break controlled by a contact which is opened by a ball of one size and remains closed on the passage of a ball of the other size, and means for feeding said separated balls successively past said contact to open and close said circuit.

44. A selecting mechanism, comprising a storage device containing a stock of movable elements of one kind, a second storage device containing a stock of movable elements of another kind, manually-operated means for separating different combinations of elements from said storage devices, an electric circuit controlled differentially by the elements so separated, power-operated means for feeding the elements of said combinations in proper order into position for influencing said circuit, and selective means for either distributing said elements to their respective storage devices or causing them to again affect the electric circuit controlling means.

45. A selecting mechanism, comprising a stock of unit elements of two sizes, means for integrating from said stock of unit elements a combination, an operated device actuated by units of one size, and mechanism for moving said unit elements into and out of operative relation to said operated device.

46. A selecting mechanism, comprising a stock of unit elements of two sizes, means for integrating from said stock of unit elements a combination, an operated electrical device actuated by units of one size, and mechanism for moving said unit elements into and out of operative relation to said operated device.

47. A selecting mechanism, comprising a stock of unit elements of two kinds, means for integrating from said stock of unit elements a combination, and means for utilizing said combinations including transferring means, and two controlling devices, one of which is operative on the transfer of each of the elements of a combination, and the other is operative on the transfer of units of one kind only.

48. The combination with a selecting mechanism embodying means for setting up combinations of unit elements, of means for transferring said combinations including a pivoted balance-wheel adapted for engaging said elements, and means for oscillating the wheel back and forth, including an electric circuit and means for opening and closing a break in said circuit.

49. The combination with a selecting mechanism embodying means for setting up combinations of unit elements, of means for transferring said combinations which include a pivoted balance-wheel adapted for engaging said elements, and means for oscillating the wheel back and forth, including an electric circuit and automatic means for opening and closing a break in said circuit.

50. The combination with a selecting mechanism embodying means for setting up combinations of unit elements, of means for transferring said combinations which include a pivoted balance-wheel adapted for engaging said elements, and means for oscillating the wheel back and forth, including an electric circuit, an electrical power device, and automatic means for opening and closing a break in said circuit.

51. The combination with a selecting mechanism embodying means for setting up combinations of unit elements, of means for transferring said combinations which include a pivoted balance-wheel adapted for engaging said elements, and means for oscillating the wheel back and forth, including an electric circuit, an electrical power device, and automatic means controlled by the oscillation of the wheel for opening and closing a break in said circuit.

52. The combination with a selecting mechanism embodying means for setting up combinations of unit elements, of means for transferring said combinations which includes a pivoted balance-wheel adapted for engaging said elements, and means for oscillating the wheel back and forth which include an electric circuit having two switches which are successively opened, one by certain of the unit elements and the other by the balance wheel.

53. The combination with a selecting mechanism embodying means for setting up combinations of unit elements, of a pivoted balance wheel for engaging with and transferring said unit elements, and means for oscillating said balance wheel, including an electric circuit having a switch operated by certain of the unit elements and a second switch operated by the balance wheel, and automatic means for opening the second switch in advance of the first mentioned switch and for closing the second switch subsequent to the closing of the first mentioned switch.

54. The combination with a selecting mechanism embodying means for setting up combinations of unit elements, of means for transferring said combinations including a pivoted balance-wheel adapted to engage with said elements, electrical means for oscillating it in one direction and a second power device for oscillating it in the other direction.

55. The combination with a selecting mechanism embodying means for setting up combinations of unit elements, of means for transferring said combinations from one position to another which include a pivoted balance-wheel adapted to engage said elements, electrical means for oscillating it in one direction, and a spring for oscillating it in the other direction.

56. The combination with a selecting mechanism embodying means for setting up combinations of unit elements, of means for transferring said combinations from one position to another, including a pivoted balance-wheel adapted to engage said elements and having a magnetic armature segment, an electromagnet co-operative with said segment for oscillating said balance-wheel in one direction, and a second power device for oscillating it in the other direction.

57. The method of signaling consisting in setting up in single file given combinations of unattached unit elements of different sizes, causing them to pass a sending station in said single file arrangement, and causing electrical signals to be sent from said station corresponding in arrangement and timing with said combination, and corresponding in number to one size of unit elements.

58. The method of signaling consisting in setting up in single file unattached unit elements of different sizes to form combinations, causing them to pass a sending station in single file, causing electrical impulses to be sent from said station corresponding in arrangement and timing with said combination, and in number with one size of unit elements, and changing the said electrical impulses at a receiving station to audible signals of the same arrangement, timing and number.

Signed at New York in the county of New York and State of New York this 4th day of November, A. D. 1915.

CHARLES R. UNDERHILL.